Figure 8:
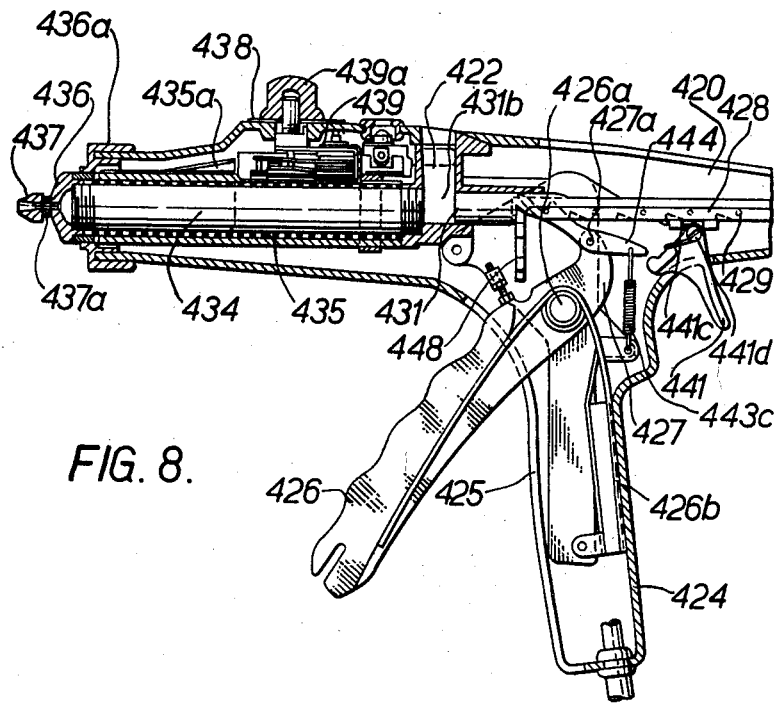

Nov. 3, 1964 R. H. GARDENER 3,154,811
MOBILE MEANS FOR PLASTICIZING AND APPLYING THERMOPLASTIC
MATERIALS AND INCLUDING INJECTION MOLDING AND EXTRUSION
Filed Feb. 14, 1962 9 Sheets-Sheet 1
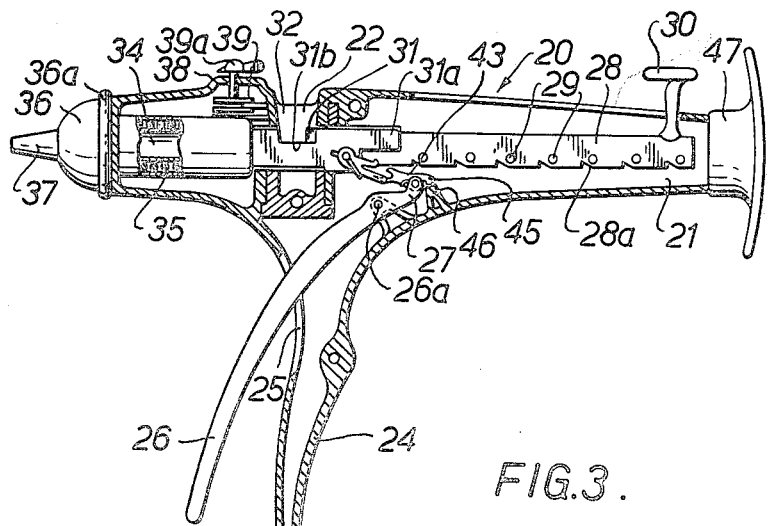
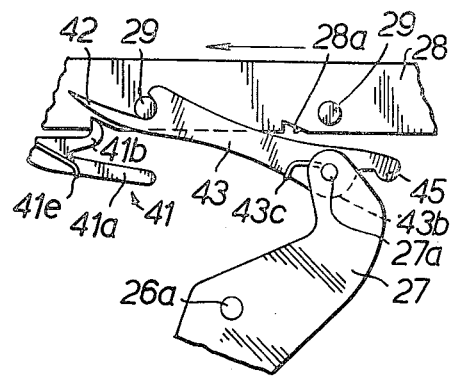
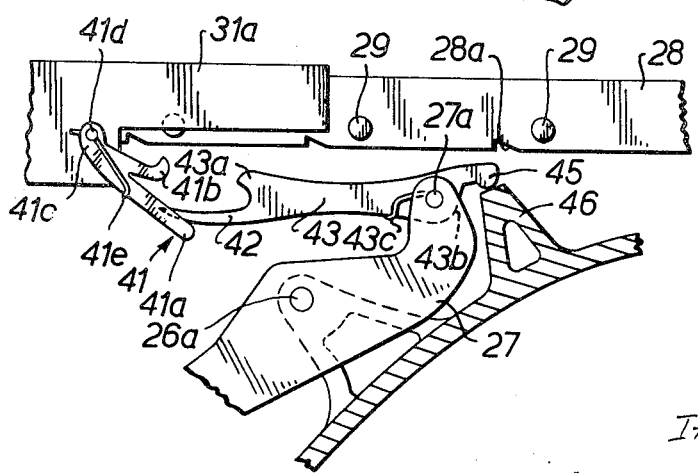
Inventor
Reginald H. Gardener
By Stevens, Davis, Miller & Mosher
Attorneys

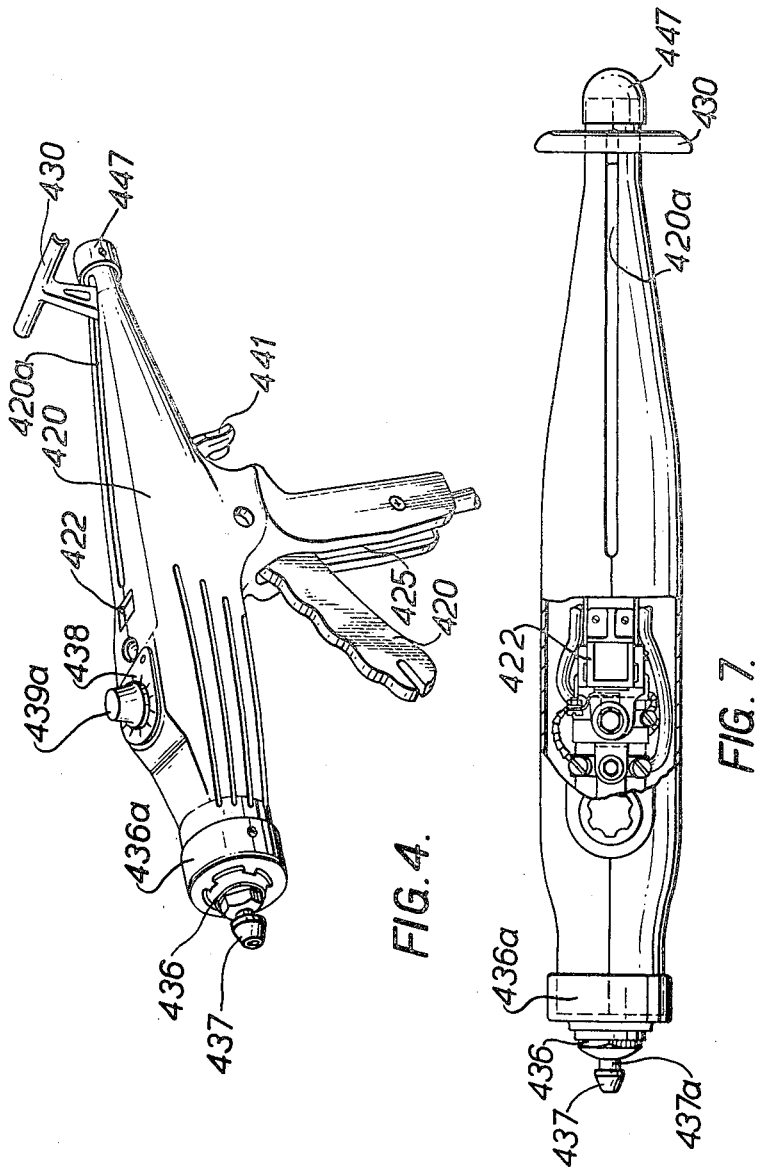

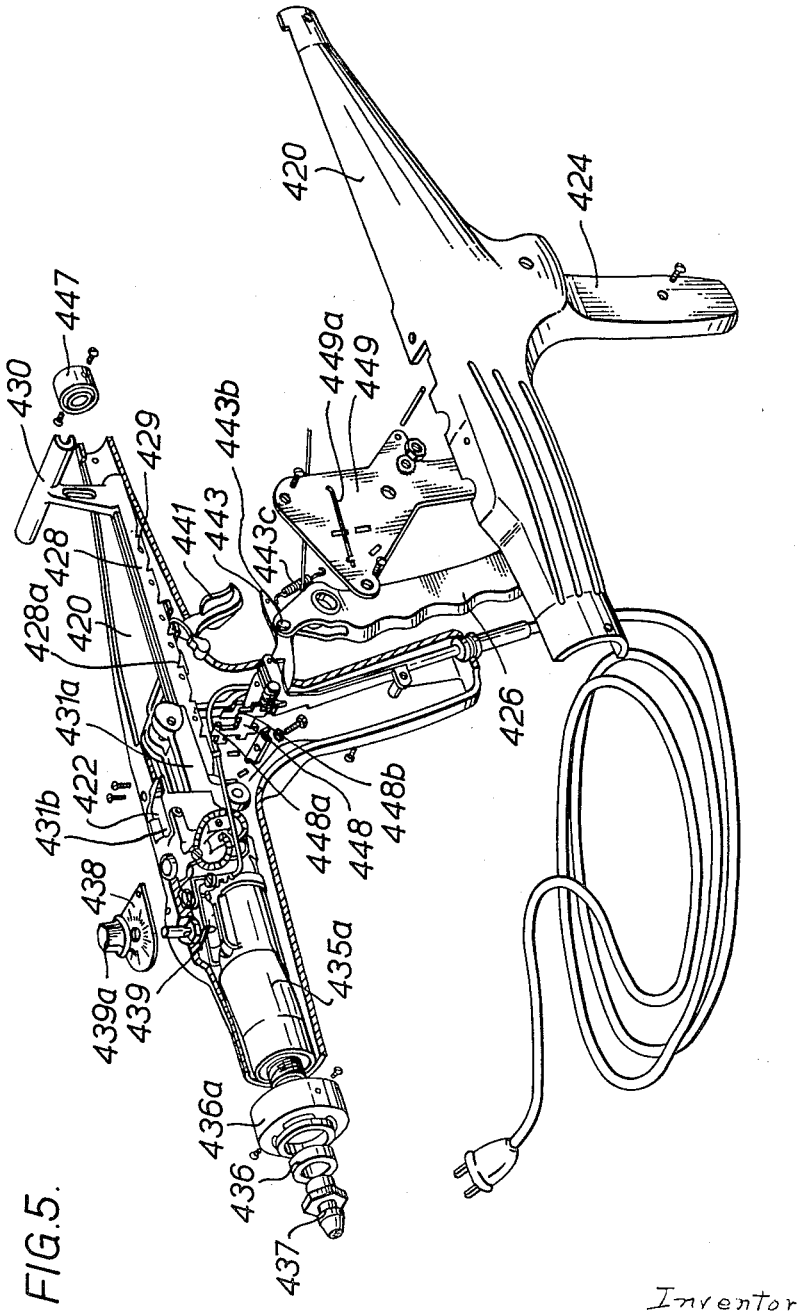

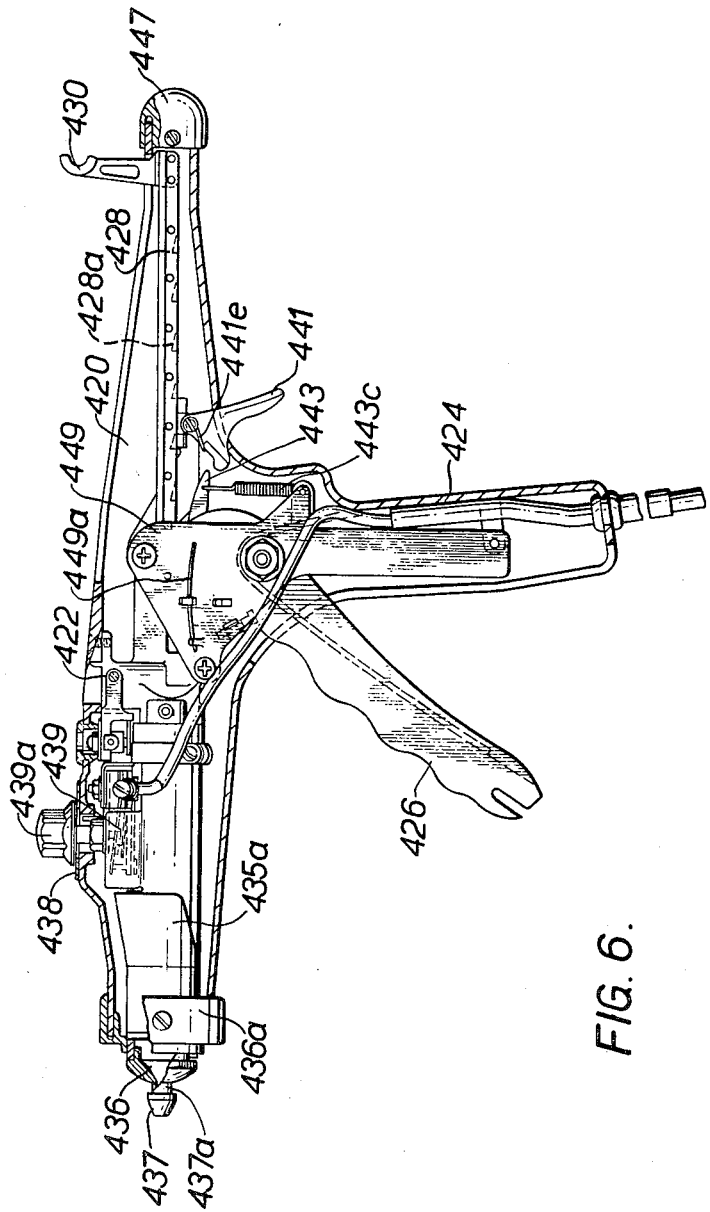

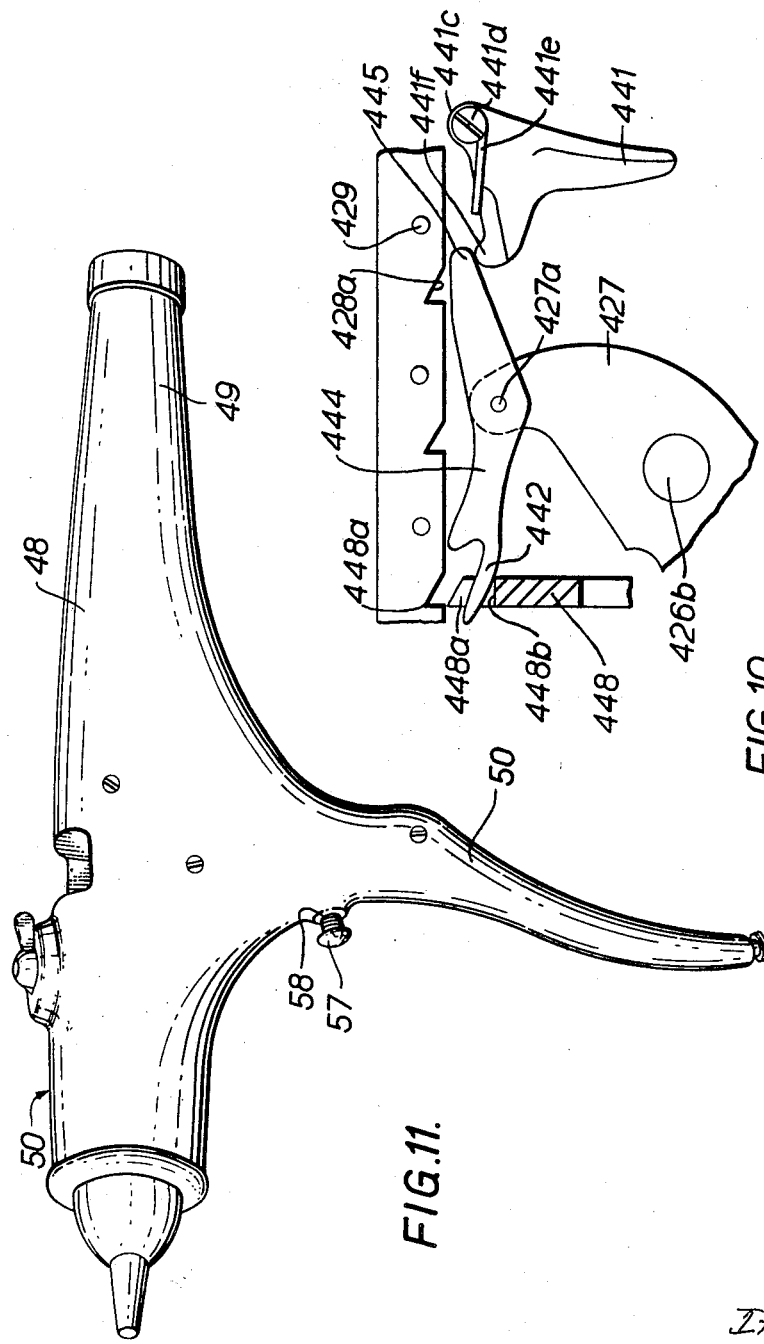

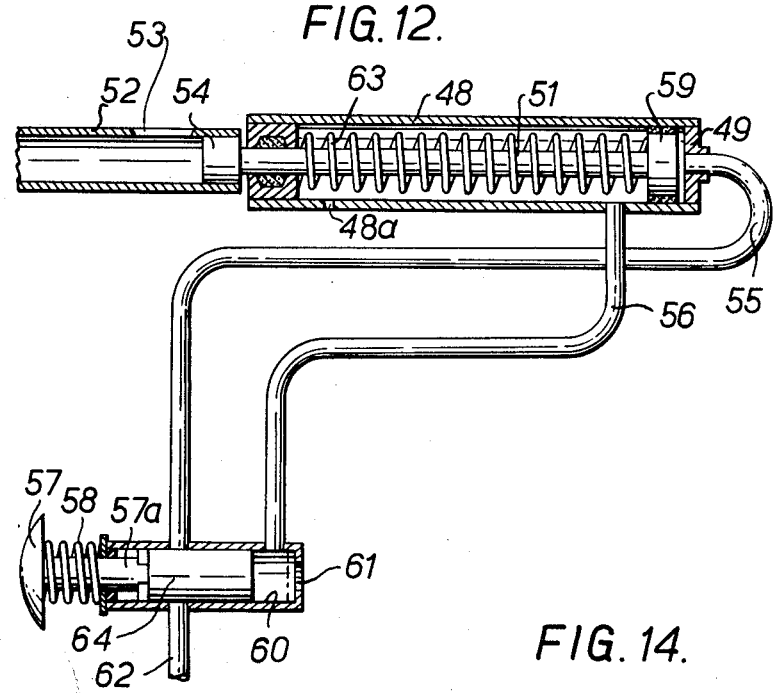
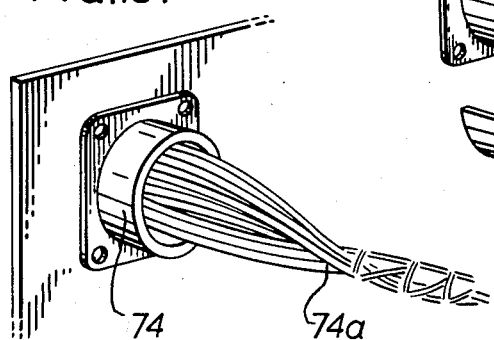
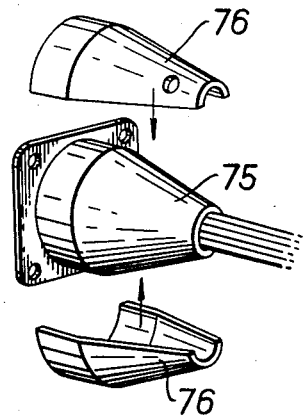

Inventor
Reginald H. Gardener
By Stevens, Davis, Miller & Mosher
Attorneys

Nov. 3, 1964 R. H. GARDENER 3,154,811
MOBILE MEANS FOR PLASTICIZING AND APPLYING THERMOPLASTIC
MATERIALS AND INCLUDING INJECTION MOLDING AND EXTRUSION
Filed Feb. 14, 1962 9 Sheets-Sheet 9

69

70

69

*Inventor*
Reginald H. Gardiner
By Stevens, Davis, Miller & Mosher
*Attorneys*

United States Patent Office 3,154,811
Patented Nov. 3, 1964

3,154,811
MOBILE MEANS FOR PLASTICIZING AND
APPLYING THERMOPLASTIC MATERIALS
AND INCLUDING INJECTION MOLDING
AND EXTRUSION
Reginald H. Gardener, Edmonton, Alberta, Canada, assignor to Northwest Industries Limited, Edmonton, Alberta, Canada
Filed Feb. 14, 1962, Ser. No. 173,283
2 Claims. (Cl. 18—12)

This invention relates to a gun for extruding thermoplastic material. This application is a continuation-in-part of application Serial No. 756,934, filed August 25, 1958, now abandoned.

The principles of both injection molding and extruding machines for use with thermoplastic materials have been established over a considerable period of time.

Basically both types of machines employ means for introducing raw thermoplastic materials in granulated form via a hopper into a heated cylinder. The heated cylinder causes the thermoplastic material to become plastic, i.e. becomes pliable. This plastic material is then forced by means of a piston or fluted revolving screw into or through forming dies, the material taking the shape of such dies after a cooling period has been effected.

The machines as now used are, by reason of their design and present function, immobile and restricted to producing large quantities of items or lengths of extrusions as predetermined by the dies so fitted. The production of small quantities being uneconomical, due to the cost of the dies and the operation of the equipment, these machines are impractical.

One object of the present invention is to provide a gun for extruding thermoplastic material, which gun is small, hand held and either mechanically or manually operated.

Another object of the present invention is the provision, in such a gun, for containing thermoplastic material which avoids the necessity of making a cohesive mass from many small granules as now used.

Another object of the present invention is to provide such a gun wherein there is a greater capacity for a short cylinder and which provides a known amount of material for each charge.

A further object of the present invention is to provide such a gun wherein the thermoplastic material is melted by means of a combination of heat and pressure.

A still further object of the present invention is to provide such a gun in which a thermostat is used for the purpose of setting temperature controls to combinate various types of thermoplastic materials, or alternatively to allow varying speeds of operation of the unit.

A still further object of the present invention is the provision of such a gun which utilizes nozzles having predetermined shapes to allow extruding predetermined shapes performing free hand configuration or injection molding into dies.

According to a broad aspect of this invention, there is provided, in a portable gun for injection molding and extruding thermoplastic material which, under the influence of heat and pressure, is reduced to its plasticated condition, said gun including a hollow casing provided with a handle, the combination of: (a) a hollow barrel of essentially uniform internal diameter throughout its length; (b) electrical heating means surrounding only said barrel along substantially its entire extent; (c) an adjustable thermostatic switch controlling said heating means; (d) a nozzle selected from an injection molding nozzle and an extrusion nozzle detachably secured in axial tandem alignment at the forward end of said barrel; (e) a material hopper secured in axial tandem alignment at the rearward end of said barrel, said hopper being provided with a radial inlet opening through which said thermoplastic material is introduced into said barrel; (f) a ram, slidable through said hopper, and into said barrel as far as said nozzle, the forward end of said ram being of uniform cross-section, the rearward end of said ram being bifurcated and being provided with a plurality of transverse pins bridging said fork and disposed along the length thereof and spaced a substantial distance apart, and a plurality of notches extending upwardly from the bottom surface of said bifurcated portion, said notches being disposed along the length thereof and spaced in alternate array from said transverse pins, whereby said ram may be actuated manually to be propelled forwardly in a series of substantially long uniform discrete stepwise advances; (g) manually actuatable means engageable with said pins to propel said ram in a forward direction in order rapidly to eject the plasticated thermoplastic material from said barrel by a minimal number of strokes of said manually actuatable means before said material can chill and revert to its solid state in said nozzle while being injected into a mold through said nozzle; (h) means biased automatically to engage said notches to prevent rearward movement of said ram; (i) means manually actuatable to engage said means (h) to disengage said means (h) from said notches to permit rearward movement of said ram; said means (g), (h) and (i) being physically disconnected from said ram to permit said ram to be automatically pushed back in response to a predetermined excess pressure generated by the expansion of said plasticated thermoplastic material in said barrel against the face of said ram.

In the preferred embodiment of this invention, the means (g), (h) and (i) cumulatively comprise: an operating handle pivotally mounted within said casing at a point near its upper end; a pawl comprising a heel, a toe and a fulcrum pivotally and free-floatingly attached to the upper end of said operating handle, a portion of the toe of said pawl being adapted to engage a selected one of said pins; a release trigger comprising a cam adapted to engage the heel of said pawl, a fulcrum and a handle, said trigger being pivotally mounted, adjacent to said pawl; a ratchet automatically engageable with said notches normally to prevent rearward movement of said ram; said release trigger being spring biased to rest, normally, with the cam thereof out of engagement with the heel of said pawl; said pawl being spring biased to rest, normally, with a portion of its toe in engagement with a pin; whereby, upon manual movement of said trigger, said toe of said pawl is moved out of engagement with said pin, and said ratchet is moved out of engagement with said notch, to permit rearward retraction of said ram.

Figure 9:
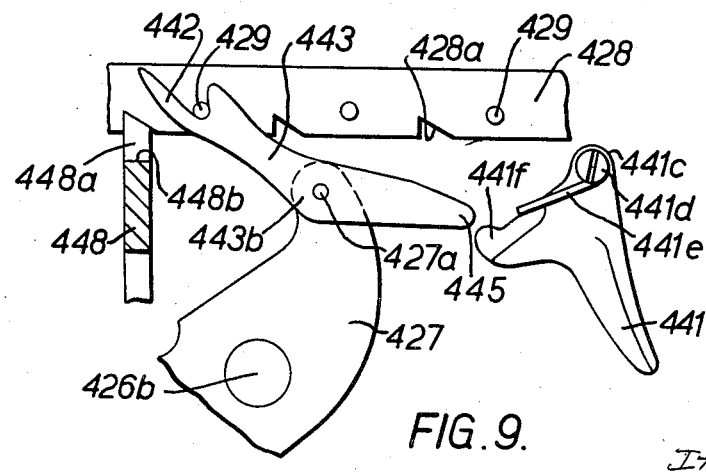
Figure 15:
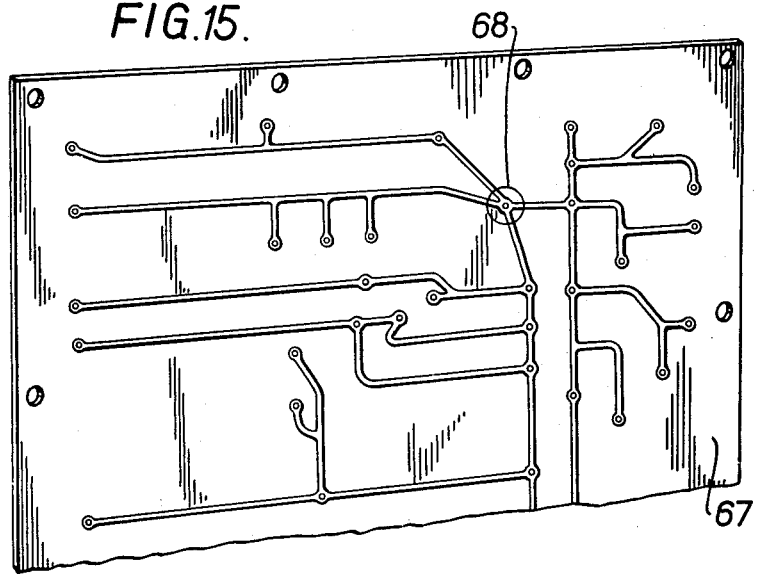
Figure 16:
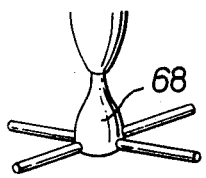
Figure 17:
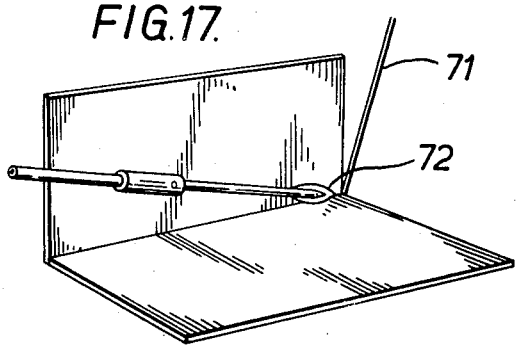
Figure 18:
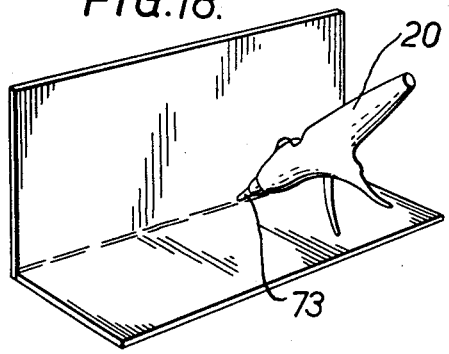
Figure 19:
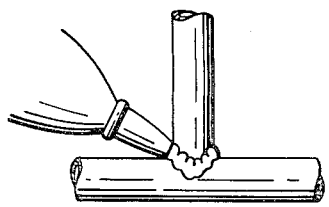
Figure 20:
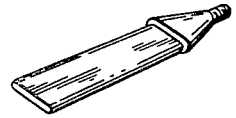
Figure 21:
Figure 22:
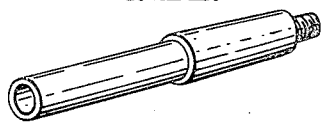
Figure 24:
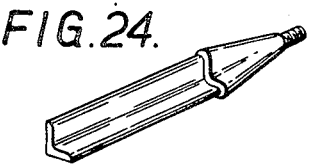
Figure 23:
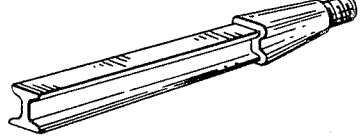
Figure 25:
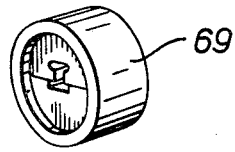
Figure 26:
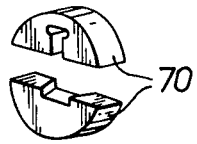
Figure 27:
Figure 28:
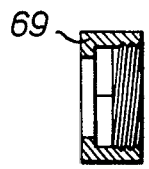

In drawings which illustrate embodiments of this invention:

FIG. 1 is a cross-sectional view of a mechanically operated gun according to this invention, FIG. 2 is an enlarged detail of the actuating mechanism of the gun of FIG. 1 in a disengaged position, FIG. 3 is an enlarged detail of the actuating mechanism of the gun of FIG. 1 in an engaged position, FIG. 4 is a perspective view of another mechanically operated gun according to the invention, FIG. 5 is an exploded view of the gun of FIG. 4, FIG. 6 is a cross-section of the gun of FIG. 4, FIG. 7 is a top view, partly in section of the gun of FIG. 4, FIG. 8 is another cross-section of the gun of FIG. 4, showing the actuating mechanism of the gun, FIG. 9 is an enlarged detail of the actuating mechanism of the gun of FIG. 4 in an engaged position, FIG. 10 is an enlarged detail of the actuating mechanism of the gun of FIG. 4 in a disengaged position, FIG. 11 is a perspective view of a pneumatically operated gun according to the present invention, FIG. 12 is a diagrammatic vertical cross-section of the actuating means of the gun of FIG. 11, FIGS. 13 and 14 are perspective exploded views showing a type of application of the gun of the present invention, showing the "in position" for the encapsulation of electrical connection, FIGS. 15 and 16 are perspective views illustrating the application of the gun of the present invention for the use of a thermoplastic material in the encapsulation of check points in position in electronic equipment, FIG. 17 is a perspective view illustrating a previous method of bonding in order to form a joint between two pieces of plastic material, FIG. 18 is a perspective view illustrating the application of the bonding of two pieces of plastic material using the gun of the present invention, FIG. 19 is a perspective view illustrating joining plastic pipes using the gun of the present invention, FIGS. 20, 21, 22, 23 and 24 are perspective views of typical extruding nozzles which may be used on a gun according to the present invention and show the various cross-sections which they produce, and FIGS. 25 and 26 are perspective views and FIGS. 27 and 28 are vertical cross sectional views of die assemblies which may be used with a gun according to the present invention.

The size and shape of the gun for extruding thermoplastic material of the present invention can, of course, be varied and the present description will deal primarily with a miniaturized version that can be held by hand and operated either mechanically or pneumatically.

The gun shown in FIG. 1 has an elongated hollow casing 20 provided with a breech magazine 22. A sleeve 31a extends across the magazine 22, and a port 31b is formed in the sleeve through which raw plastic material in the form of cartridges can be transferred from the magazine into the sleeve. The use of cartridges instead of, for example, small granules relieves the gun of work to be done to form the plastic material into a cohesive mass. The sleeve communicates at its forward end with a barrel 34, which terminates at its forward end in a nozzle head 36 to which a nozzle 37 is detachably secured. The barrel is provided with an electrical heating element 35, and a thermostatic switch denoted generally by 39, which is subject to the temperature of the barrel and which is adapted to make or break the supply of electrical energy to the element 35 depending on whether the barrel temperature is respectively below or above a predetermined value. The thermostatic switch is adjustable over a scale 38 to vary the predetermined value to suit different types of thermoplastic material, and different rates of operation of the gun.

An elongated rack 28 has a striker 31 at its forward end which is slidable forwardly within the sleeve to transfer plastic material from the sleeve into the barrel, in which the striker is also slidable. The rack has a plurality of transversely extending pins 29 and a plurality of notches 28a extending upwardly from the bottom edge of the rack, the pins and notches both being spaced along the length of the rack. A release trigger ratchet 41 (see FIG. 3) is pivotally mounted on the body 20 at fulcrum 41c by means of pin 41d to act as a Class 2 lever and is spring-biased upwardly by means of spring 41e so that when a tooth 41b of the ratchet 41 engages any of the notches 28a, the rack is prevented from moving rearwardly.

The casing is provided with a pistol grip 24 having a slot 25 therein through which a manually operable member in the form of an operating handle 26 extends. The handle 26 is pivotally mounted within the casing near its upper end 27 at pivot 26a whereby to act as a Class 1 lever. A pawl 43 is pivotally and free-floatingly mounted on the upper end of the handle 26 intermediate a toe 42 and a heel 45 of the pawl at fulcrum 43b by means of pin 27a so that it acts as a Class 1 lever (see FIG. 2). The pawl is spring-biased upwardly relative to the handle 26 by means of spring 43c, and when a portion of the toe 42 engages any one of the pins 29 of the rack, and the handle 26 is moved towards the piston grip 24, the rack 28 is advanced through a short forward step movement to the succeeding one of a series of positions, in each of which the ratchet engages a respective one of the notches 28a. The handle 26 can be moved away from the pistol grip 24, so that the heel 45 abuts a cam stop 46 mounted in the casing, causing the toe 42 to engage an arm 41a of the ratchet which extends rearwardly of the pivotal connection of the ratchet to the sleeve 31, so that both the pawl and the ratchet disengage from the rack as shown in FIG. 2, and allow rearward movement of the rack. Such rearward movement may also be effected by means of a cocking piece 30 which is rigidly secured to the rack 28, and which extends through a slot formed in the upper surface of the casing 20. A hand butt 47 is provided at the rear end of the casing 20.

In operation, first the power supply to the heating element 35 is switched on so that the barrel is heated to the temperature determined by the thermostatic switch 39. After this warming-up period, which may last from 1 to 1½ minutes, the handle 26 is moved away from the pistol grip 24 and the rack 28 is retracted by the cocking piece 30 so that the striker 31 occupies a position which is rearward relative to the port 31b, e.g. as shown in FIG. 1. Cartridges are then inserted one at a time via the breech magazine 22 and the port 31b, into the sleeve 31a, and as each cartridge is inserted, the striker is given a short forward step movement, by the cocking piece 30, or by moving the handle 26 towards the pistol grip 24 if the cocking piece 30 is difficult to move forwardly by hand, to urge the cartridge forwardly of the port 31b within the sleeve 31a. The rack 28 is then retracted, after operating the handle 26 to release the rack if this is necessary, so that a further cartridge can be inserted through the port 31b, forwardly of the striker 31. Thus, the barrel 34 is progressively filled with thermoplastic material, which becomes plasticised within the barrel. Pressure may build up in the barrel due, for example, to gases released by the plasticised material, and if then the rack is released by moving the handle 26 away from the pistol grip 24, the rack will be forced rearwardly by the pressure within the barrel. In order to extrude the plasticised material, the rack is advanced stepwise by repeatedly squeezing the handle 26 towards the pistol grip 24, and releasing the handle 26, and during this process, the striker 31 advances into the barrel, and forces substantially all the material therein through the nozzle head 36 and the nozzle 37 which is held to the barrel by ring 36a.

The gun shown in FIGS. 4–10 has an elongated hollow casing 420 provided with a breech magazine 422. A sleeve 431a extends across the magazine 422, and a port 431b is formed in the sleeve through which raw plastic material in the form of cartridges can be transferred from the magazine into the sleeve. The use of cartridges instead of for example small granules relieves the gun of work to be done to form the plastic material into a cohesive mass. The sleeve communicates at its forward end with a barrel 434, which terminates at its forward end in a nozzle head 436 attached to the barrel by ring 436a and to which a nozzle 437 is detachably secured. Between nozzle 437 and nozzle head 436 is a recess 437a (FIGS. 6, 7 and 8) adapted to receive a locking device (not shown) to assist in molding operations. The barrel is provided with an electrical heating element 435, a heat deflector shield 435a which, in the preferred embodiment, is chrome plated for heat reflection purposes and a thermostatic switch denoted generally by 439, which is subject to the temperature of the barrel and which is adapted to make or break the supply of electrical energy to the element 435 depending on whether the barrel temperature is respectively below or above a predetermined value. The thermostatic switch is adjustable over a scale 438 by means of a knob 439a to vary said predetermined value to suit different types of thermoplastic material, and different rates of operation of the gun.

An elongated rack 428 has a striker 431 at its forward end which is slidable forwardly within the sleeve to transfer plastic material from the sleeve into the barrel, in which the striker is also slidable. The rack has a plurality of transversely extending pins 429 and a plurality of notches 428a extending upwardly from the bottom edge of the rack, the pins and notches being both alternately spaced along the length of the rack. A release trigger 441 (see FIGS. 8, 9 and 10) is pivotally mounted on the body 420 at fulcrum 441c by means of pin 441d to act as a Class 2 lever, and is spring-biased downwardly by means of spring 441e. The casing is provided with a pistol grip 424 having a slot 425 therein through which a manually operable member in the form of an operating handle 426 extends. The handle 426 is pivotally mounted within the casing near its upper end 427 at pivot 426a whereby to act as a Class 1 lever and is spring-biased away from the pistol grip 424 by means of spring 426b. A pawl 443 is pivotally and free-floatingly mounted on the upper end of the handle 426 intermediate a toe 442 and a heel 445 of the pawl at fulcrum 443b by means of pin 427a so that it acts as a Class 1 lever (see FIG. 2). A ratchet 448 is held in engagement with the rack 428 by means of plate 449 and a spring 449a so that the tooth 448a of the ratchet 448 engages one of the notches 428a of the rack 428 and so the channel 448b of the ratchet 448 is adapted to engage the toe 442 of the pawl 443. The pawl 443 is spring-biased upwardly relative to the handle 426 by means of spring 443c and when a portion of the toe 442 engages any one of the pins 429 of the rack, and the handle 426 is moved towards the pistol grip 424, the tooth 448a of ratchet 448 is withdrawn from the notch 428a and the rack 428 is permitted to be advanced through a short forward step movement to the succeeding one of a series of positions where the tooth 448a of the ratchet 448 again engages a notch 428a. The handle 426 can be moved away from the pistol grip 424, so that because of the free-floating mounting of pawl 443 slight rearward movement of the rack 428 is permitted. The rack 428 may be released by moving release trigger 441 against its spring bias to cause its heel 441f to engage the heel 445 of the pawl 443, urging it upward so that the toe 442 of the pawl 443 is moved away from the pin 429, then engages the channel 448b of the ratchet 448, thereby moving the ratchet downwardly thus releasing tooth 448a from notch 428a. Rearward movement may then be effected following such release by movement of the cocking piece 430 which is rigidly secured to the rack 428, and which extends through a slot 420a formed in the upper surface of the casing 420. A cup-shaped tip 447 is provided at the rear end of the casing 420 to assist in retaining the two halves of casing 420 together.

In operation, first the power supply to the heating element 435 is switched on so that the barrel is heated to the temperature determined by the thermostatic switch 439. After this warming-up period, which may last from 1 to 1½ minutes, the handle 426 is moved away from the pistol grip 424, the release trigger is actuated (see FIG. 10) and the rack 428 is retracted by the cocking piece 430 so that the striker 431 occupies a position which is rearward relative to the port 431b, e.g. as shown in FIG. 8. Cartridges are then inserted one at a time via the breech magazine 422 and the port 431b, into the sleeve 431a, and as each cartridge is inserted, the striker is given a short forward step movement, by the cocking piece 430, or by moving the handle 426 towards the pistol grip 424 if the cocking piece 430 is difficult to move forwardly by hand, to urge the cartridge forwardly of the port 431b within the sleeve 431a. The rack 428 is then retracted, after releasing the rack as hereinbefore described so that a further cartridge can be inserted through the port 431b, forwardly of the striker 431. Thus the barrel 434 is progressively filled with thermoplastic material, which becomes plasticised within the barrel. Pressure may build up in the barrel due for example to gases released by the plasticised material, and if then the rack 428 is released by moving the handle 426 away from the pistol grip 424, the rack will be forced slightly rearwardly by the pressure within the barrel. In order to extrude the plasticised material, the rack 428 is advanced stepwise by repeatedly squeezing the handle 426 towards the pistol grip 424, and releasing the handle 426, and during this process, the striker 431 advances into the barrel and forces substantially all the material therein through the nozzle head 436 and the nozzle 437.

The gun shown in FIG. 11 differs primarily from that shown in FIGS. 1 and 4 in the means for actuating the striker. These means are shown in FIG. 12.

The striker is denoted at 54 and is slidable within a sleeve 52 having a lateral port 53, the sleeve and port corresponding to the sleeve 31 and port 31b of the gun shown in FIG. 1. The striker 54 is carried on the end of a ram 51 having a piston 59 slidably mounted in a cylinder 48. A spring 63 resiliently urges the piston 59 towards the rear end 49 of the cylinder and the cylinder has an air bleed port 48a. First and second conduits 55, 56 are connected to the cylinder through the rear end thereof, and through the side wall thereof a short distance forward of the rear end. The conduits are connected to a valve cylinder 60 to which a source of compressed air (not shown) is connected via a conduit 62. The cylinder 60 has a slidable valve member 64 controlled by a manually operable member in the form of a press button 57 which is urged away from the cylinder 60 by a spring 58. The press button 57 is mounted on a pistol grip 50 of the gun as shown in FIG. 11. The cylinder 60 has a port 61 which opens to atmosphere.

In operation, when the valve member 64 is in a first setting which is illustrated in FIG. 12, the conduit 55 is blocked and the conduit 56 is open to atmosphere (via port 61). Furthermore the piston 59 is disposed at the rear end of the cylinder, in which piston position the striker 54 is disposed rearwardly relative to the port 53. A cartridge of thermoplastic material is then inserted into the sleeve 52 through the port 53, and the valve member 64 is moved by the push button to a second setting in which the conduit 55 communicates with the conduit 62 whilst the conduit 56 remains open to atmosphere. The piston 59 is therefore urged by the compressed air from conduit 62 through a short forward step movement forwardly of where the conduit 56 is connected to the cylinder, so that the striker 54 moves the inserted cartridge forwardly of the port 53. Release of the push button 57 causes the piston 59 to move under the influence of spring 63 to the rear end of the cylinder again, air being drawn through the port 48a, so that a further cartridge can be inserted into the sleeve 52 via the port 53.

When the barrel (not shown) of the gun is charged with a desired amount of the thermoplastic material, and the material is plasticized, the push button is operated to move the valve member 64 to a third setting in which the conduit 55 communicates with the conduit 62 whilst the conduit 56 is blocked. Thus the piston is urged by compressed air from the conduit 62 to adjacent the forward end of the cylinder, air escaping through the port 48a, so that the striker 54 moves to the forward end of said barrel (not shown) and forces substantially all the plasticised thermoplastic material from the barrel through the nozzle of the gun. This latter movement of the striker 54 is relatively longer than the short forward movement it performs when the valve member is moved from its first setting to its second setting.

This form of gun has the advantage over the gun shown in FIG. 1 that the plasticised material can be forced out of the barrel continuously rather than in successive steps.

It will be appreciated that with the three forms of gun that have been described, extrusion of plasticised material can be stopped, either by moving the handles 26 or 426 away from the pistol grips 24 or 424 respectively so as to release the racks 28 or 428 respectively, or by releasing the push button 57. If then pressure within the barrel tends to increase due to expansion of the remaining plasticised material, or due to the production or expansion of gas within the plasticised material, the material will not necessarily be extruded from the gun, but rather the striker will tend to be urged rearwardly in the barrel.

A gun according to the invention can be used in many different ways, some of which are given below.

*Injection Molding*

For injection molding, the gun is fitted with a nozzle having an externally tapered surface and a small circular internal bore. The nozzle is inserted into a complementary orifice in a mold, which may be a split mold, and is held in position during injection of plasticised material via said complementary orifice into the mold by hand pressure exerted on the hand butt of the gun (e.g. 47 FIG. 1).

For example, electrical high tension terminal posts, electrical connections or cables may be encapsulated with thermoplastic material of suitable dielectric strength using injection molding techniques. The mobility of the gun is of advantage here, since it can be used on installed electrical equipment in places which are not accessible to immobile injection molding machines.

FIGS. 13 and 14 show a panel wherein, in FIG. 13 there is a fixture 74 from which a plurality of electrical cables 74a extend, and wherein, in FIG. 14 there is a similar fixture whose cables have been encapsulated at 75 with thermoplastic material using a split die formed of two portions 76. As the thermoplastic material cools after it has been injected into the split die, it shrinks and grips the cables so as to protect them from moisture, and strengthens the cables where they emerge from the panel fixture. The thermoplastic material can be for example polyethylene. The encapsulation can be removed if desired using a sharp knife.

FIG. 15 shows a panel 77 of a piece of electronic equipment. A die 78 is located against the panel 77 as indicated in the drawing of the panel, and the detail in FIG. 16, and coloured thermoplastic material is injected into the die to secure the electrical junction in position on the panel. The junction is a check point used in testing the piece of electronic equipment, and can be provided with a needle probe orifice. The colouring of the thermoplastic material may enable the check point to be readily identified.

*Bonding*

FIG. 17 illustrates bonding two sheets of polyethylene or polyvinyl chloride using a previous method, the bond being achieved by fusing, to the sheets, a rod 71 of a similar plastic material, using flame 72. This is a highly skilled operation. The bond can be formed more simply and easily using a gun 20 according to the invention, as shown in FIG. 18. The gun is fitted with a suitable nozzle 73, and is charged with the same material as the plastic sheets. The nozzle is drawn along the angle between the sheets to plasticise them locally, while the plasticised material within the gun is extruded through the nozzle to form a bond with each sheet.

A similar bonding operation is illustrated in FIG. 18 in which a joint between two pipes made, for example of polyethylene, is being formed. In the case of heavy-walled pipes, additional heat can be supplied to the pipes adjacent where they are to be joined, in a manner known to those skilled in the art, either by means of an infra-red lamp, or by a shaped heating element.

A pre-formed plastic article can have plastic material bonded to it of a different colour, using the gun in a manner similar to that described above. By successive operations a multi-coloured article can be formed.

*Extrusion*

One great advantage of using a gun according to the invention for extrusion is that the gun can be moved along any desired line, and is not restricted to straight line operation. The outlines of an article to be formed by extrusion can be marked on paper or cardboard, and the nozzle can be guided along these outlines.

FIGS. 12–24 show a typical selection of extrusion dies and the cross sections of the extrusions which they produce. These dies can be screwed into the nozzle head (e.g. 36 of FIG. 1) of the gun.

FIGS. 25–28 show extrusion die assemblies comprising a hollow collar 69 which is internally screw-threaded (see FIG. 28) and within which two portions 70 of a split die may be located. The collar 69 is then attached to the gun by screwing it onto a suitable nozzle head, which is different from that shown in FIGS. 1, 4 and 11.

The gun can be used for making extrusions which are suitable for model-making e.g. model railway lines or model building components. The gun can also be used for extruding P.V.C. or polyethylene into spaces, for example such as occur in window frames, in order to seal the spaces and exclude draughts. The extrusions could be stripped off when desired. Furthermore the gun can extrude thermoplastic material between the junction of a wall and floor, to seal the junction. The gun can also be used to extrude a thermoplastic sheath around exposed electrical wiring connections, for example in houses. Another extrusion application of the gun is in sign-writing, which can be performed on the site required. The gun can also be used to produce multi-coloured decorations on the sites where they are required, in for example restaurants or hotels, by means of successive extrusion processes.

What I claim is:

1. In a portable gun for injection molding and extruding thermoplastic material which, under the influence of heat and pressure, is reduced to its plasticated condition, said gun including a hollow casing provided with a handle, the combination of:
    (a) a hollow barrel of essentially uniform internal diameter throughout its length;
    (b) electrical heating means surrounding only said barrel along substantially its entire extent;
    (c) an adjustable thermostatic switch controlling said heating means;
    (d) a nozzle detachably secured in axial tandem alignment at the forward end of said barrel;
    (e) a material hopper secured in axial tandem alignment at the rearward end of said barrel, said hopper being provided with a radial inlet opening through which said thermoplastic material is introduced into said barrel;
    (f) a ram, slidable through said hopper, and into said barrel as far as said nozzle, the forward end of said ram being of uniform cross-section, the rearward end of said ram being bifurcated and being provided with a plurality of transverse pins bridging said fork and disposed along the length thereof and spaced a substantial distance apart, and a plurality of notches extending upwardly from the bottom surface of said bifurcated portion, said notches being disposed along the length thereof and spaced in alternate array from said transverse pins, whereby said ram may be actuated manually to be propelled forwardly in a series of substantially long discrete stepwise advances;
    (g) manually actuatable means engageable with said pins to propel said ram in a forward direction in order rapidly to eject the plasticated thermoplastic material from said barrel by a minimal number of strokes of said manually actuatable means before said material can chill and revert to its solid state in said nozzle while being injected into a mold through said nozzle;

(h) means biased automatically to engage said notches to prevent rearward movement of said ram;

(i) means manually actuatable to engage said means (h) to disengage said means (h) from said notches to permit rearward movement of said ram;

said means (g), (h) and (i) being physically disconnectable from said ram to permit said ram to be automatically pushed back in response to a predetermined excess pressure generated by the expansion of said plasticated thermoplastic material in said barrel against the face of said ram.

2. The gun of claim 1 wherein said means (g), (h) and (i) cumulatively comprise: an operating handle pivotally mounted within said casing at a point near its upper end; a pawl comprising a heel, a toe and a fulcrum pivotally and free-floatingly attached to the upper end of said operating handle, a portion of the toe of said pawl being adapted to engage a selected one of said pins; a release trigger comprising a cam adapted to engage the heel of said pawl, a fulcrum and a handle, said trigger being pivotally mounted, adjacent to said pawl; a ratchet automatically engageable with said notches normally to prevent rearward movement of said ram; said release trigger being spring biased to rest, normally, with the cam thereof out of engagement with the heel of said pawl; said pawl being spring biased to rest, normally, with a portion of its toe in engagement with a pin; whereby, upon manual movement of said trigger, said toe of said pawl is moved out of engagement with said pin, and said ratchet is moved out of engagement with said notch, to permit rearward retraction of said ram.

References Cited in the file of this patent
UNITED STATES PATENTS

| | | |
|---|---|---|
| 1,013,454 | Sherbondy | Jan. 2, 1912 |
| 2,229,839 | Crewe | Jan. 28, 1941 |
| 2,522,526 | Manning | Sept. 19, 1950 |
| 2,567,960 | Myers et al. | Sept. 18, 1951 |

FOREIGN PATENTS

| | | |
|---|---|---|
| 145,393 | Australia | May 19, 1949 |